Figure 1:
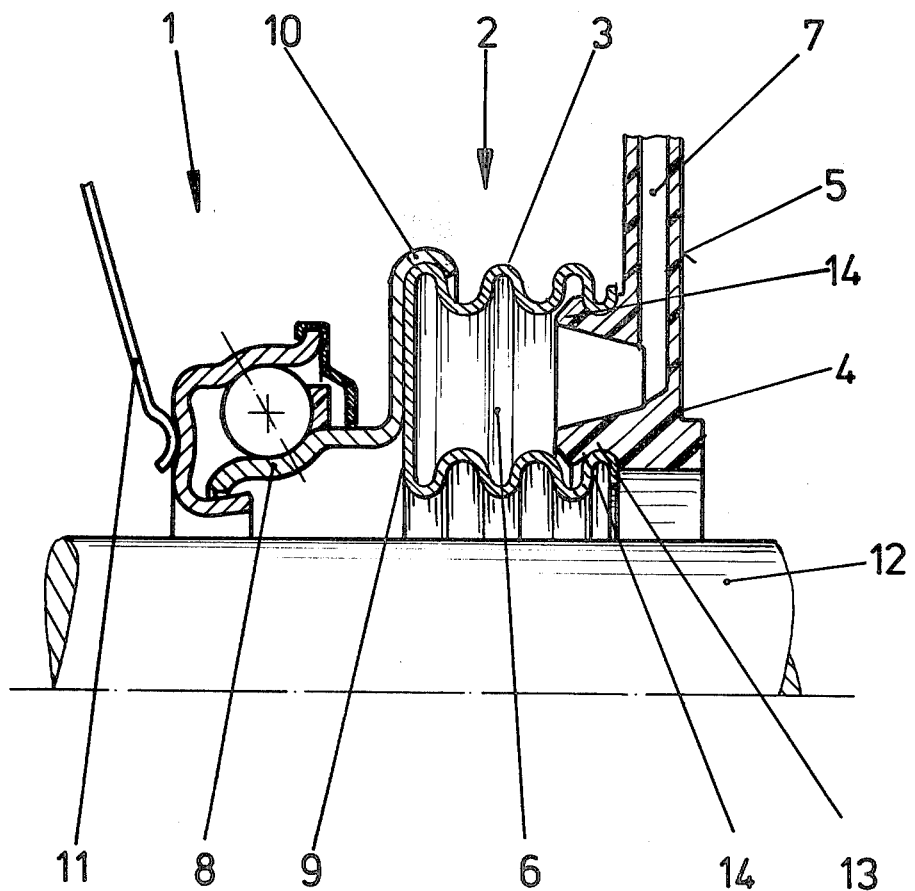

United States Patent [19]

Brandenstein et al.

[11] Patent Number: 4,482,040
[45] Date of Patent: Nov. 13, 1984

[54] HYDRAULIC RELEASE ARRANGEMENT FOR VEHICLE CLUTCHES

[75] Inventors: Manfred Brandenstein, Eussenheim; Rüdiger Hans, Niederwerrn, both of Fed. Rep. of Germany

[73] Assignee: SKF Kugellagerfabriken GmbH, Schweinfurt, Fed. Rep. of Germany

[21] Appl. No.: 402,832

[22] Filed: Jul. 29, 1982

[30] Foreign Application Priority Data

Aug. 1, 1981 [DE] Fed. Rep. of Germany ....... 3130514

[51] Int. Cl.³ .................... F16D 23/14; F16D 25/08
[52] U.S. Cl. .................................. 192/88 A; 92/35; 192/91 A; 192/98
[58] Field of Search ............ 192/85 CA, 88 A, 91 A, 192/98; 92/35, 39, 42; 277/27, 212 C

[56] References Cited

U.S. PATENT DOCUMENTS

| | | | |
|---|---|---|---|
| 1,934,206 | 11/1933 | Page | 192/88 A X |
| 2,118,604 | 5/1938 | Heidloff | 277/212 C X |
| 2,325,967 | 8/1943 | Moore | 92/35 X |
| 2,434,458 | 1/1948 | Curry | 277/27 X |
| 2,446,694 | 8/1948 | Dickson | 192/88 A |
| 2,453,841 | 11/1948 | Gluzek | 92/35 X |
| 2,477,233 | 7/1949 | Bristol | 92/35 X |
| 2,737,834 | 3/1956 | Coughlin et al. | 192/88 A X |
| 2,815,995 | 12/1957 | Young | 277/212 C X |
| 2,940,572 | 6/1960 | Warman | 192/88 A X |
| 3,463,284 | 8/1969 | Kampert | 192/88 A |
| 3,940,938 | 3/1976 | Durham et al. | 277/212 C X |
| 3,970,177 | 7/1976 | Garrett et al. | 192/91 A |
| 4,051,937 | 10/1977 | Garrett et al. | 192/91 A X |

FOREIGN PATENT DOCUMENTS

| | | | |
|---|---|---|---|
| 261374 | 6/1913 | Fed. Rep. of Germany | 192/88 A |
| 480636 | 8/1929 | Fed. Rep. of Germany | 92/35 |
| 1908640 | 3/1970 | Fed. Rep. of Germany | 192/91 A |
| 2015410 | 10/1971 | Fed. Rep. of Germany | 192/91 A |
| 662766 | 8/1929 | France | 192/91 A |

Primary Examiner—Rodney H. Bonck
Attorney, Agent, or Firm—Daniel M. Rosen

[57] ABSTRACT

The invention relates to an hydraulic release arrangement for vehicle clutches or the like and consisting of an annular cylinder axially expanding in the application of the clutch and a release bearing that is affixed to the annular cylinder without special guidance. The annular cylinder is constructed of coaxially arranged tube-shaped spring metal bellows with lateral self-sealing connection rings. Alternatively, a spring metal bellows with a U-shaped profile is used.

12 Claims, 2 Drawing Figures

HYDRAULIC RELEASE ARRANGEMENT FOR VEHICLE CLUTCHES

The invention relates to an hydraulic release arrangement for vehicle clutches or the like consisting of an annular cylinder arranged on a drive shaft or the like acting axially on a release bearing, the circumferential wall of the annular cylinder being in the form of an axially extensible spring metal bellows.

One hydraulic release arrangement of this type is known from DE-OS No. 2,015,410. The annular cylinder with a spring metal bellows used here serves only as a pressure cylinder for the release bearing and abuts loosely on its side surface. The release bearing must therefore be provided with its own axial guide. In the known arrangement there are thereby many fittings necessary, which collectively result in an expensive solution. A further disadvantage is that the axial displacement between the cup spring of the clutch and the drive shaft resulting from manufacturing tolerances can only be compensated by the insertion of an especially guided release bearing.

The object of the invention is the production of an hydraulic release bearing of the above-described type, which consists of a minimum number of elements and which also compensates for axial misalignment with a conventional release bearing.

The object is solved by forming the inner and also the outer circumferential walls as metal bellows and connecting the release bearing firmly with the spring metal bellows and arranging it to be axially and radially guided by them.

Thereby all arrangements for the axial guiding of the release bearing on the drive shaft or the like can be eliminated. The stationary race of the release bearing is, for example, connected to the spring metal bellows by welding or by a corresponding press fit. The release bearing is held thereby to the annular cylinder and thereby to the drive shaft in a concentric position. If hydraulic fluid under pressure flows into the space of the annular cylinder, the spring metal bellows expands in the axial direction and presses the release bearing affixed thereto against the cup spring of the clutch. In view of this the release bearing can not move from its coaxial position without additional radial force, since the stiffness of the spring metal bellows does not permit this. Under strong radial forces, however, as occur upon the axial misalignment between the cup spring of the clutch and the drive shaft during the application of the clutch, the bearing can move radially from its coaxial position against the spring force of the cup spring. Furthermore, the axial spring characteristics of the spring metal bellows can also adjust the angular error between the central axis of the cup spring and the drive shaft. Thereby the release bearing in accordance with the invention can advantageously compensate the axial displacement as well as the misalignment of the parts to one another. Due to the release force of the spring metal bellows the additional springs that are conventionally employed in such devices can be eliminated.

In a further embodiment of the invention the two spring metal bellows are formed as a single component with U-shaped cross-section.

In this manner the coaxial positioning of the spring metal bellows to one another is established already during the production and thereby by the precision of the work tools. Errors, which otherwise originate in the assembly, are thereby no longer possible. A further advantage arises that in this arrangement it is no longer necessary to seal one side of the annular cylinder.

According to a further feature of the invention, at least one of the side walls of the annular cylinder is formed as a self-sealing elastic connection ring.

The entire side wall of the annular cylinder is produced for example, of a plastic material. Axially projecting sealing rings are formed extending into the space of the annular cylinder and elastically abutting at any given time on the spring metal bellows. In the application of the clutch and upon the thereby increasing pressure, the pressure medium presses the sealing ring radially against the spring metal bellows, thereby the sealing action is automatically increased with rising pressure.

In a further embodiment seating surfaces are formed on the connection ring and a holding arrangement is provided for the release bearing.

As a result, the release bearing can be connected with an interference fit with the annular cylinder without welding or the like. This solution is especially economical since no special tools are necessary for the assembly.

In a further feature of the invention channels are provided in the connection ring for the pressure medium.

Since the described connection ring can be produced for example, of plastic material or the like, the channel can be formed in one operation. Furthermore, it is possible to mold a holding arrangement for the entire release device on the connection ring or to provide seating surfaces, which are adapted to the machine parts on which the release bearing will be installed. In this manner, the release bearing, according to the invention, can be suitably adapted to the respective application by interchange of components.

The invention will be described in the following with reference to the examples shown in the drawings.

Figure 2:
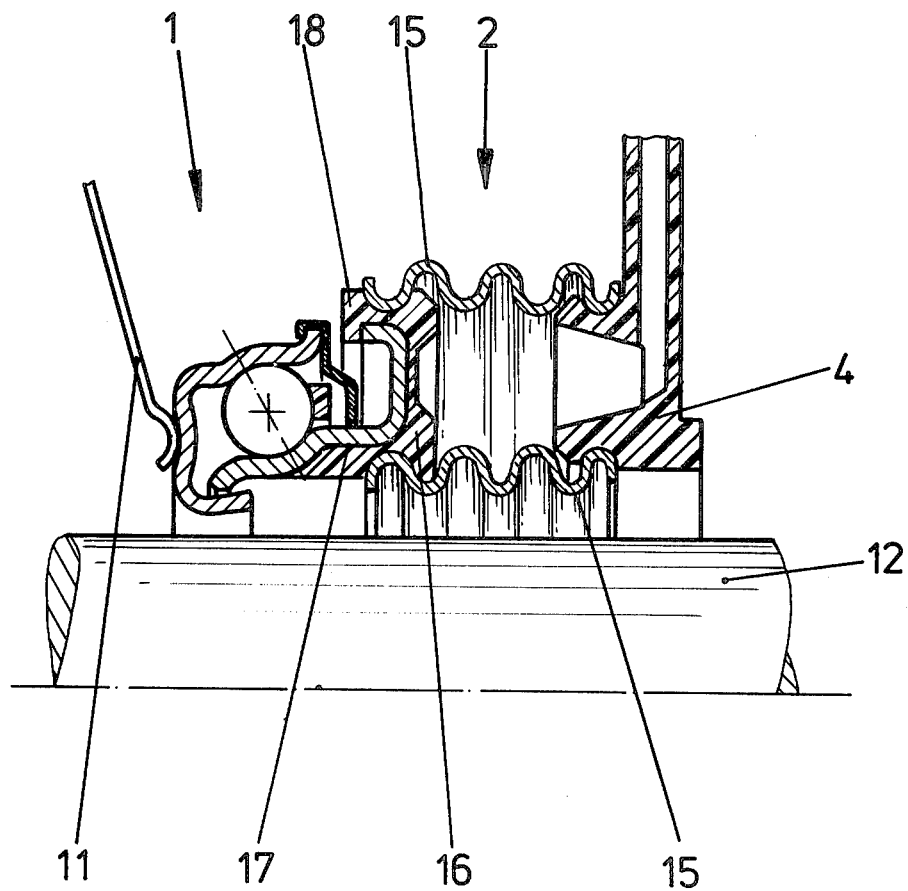

They show:

FIG. 1, a longitudinal section through an hydraulic release arrangement for vehicle clutches with U-shaped spring metal bellows and a self-sealing connection ring; and FIG. 2, a length-wise section through an hydraulic release arrangement for vehicle clutches with two separate spring metal bellows and two self-sealing connection rings.

The release arrangement illustrated in FIG. 1 includes basically a release bearing 1 and an annular cylinder 2. The annular cylinder 5 is comprised of a spring metal bellows 3 having a U-shaped profile, which is closed on one side and pressed on the other side onto a self-sealing connection ring 4. The connection ring 4 carries the entire release arrangement and has a ring-shaped sealing surface 5, upon which it may be affixed to a not-illustrated machine part. In order to guide a pressure medium and to vent the cylinder space 6, channels 7 are formed in the connection ring 4. The inner ring 8 of the release bearing 1 is affixed to the left side of the spring metal bellows, and engages the closed side cylinder wall 9 of the spring metal bellows 3 with its radial surface. During assembly the inner ring 8 is snapped onto the spring metal bellows and is held with its bent-over and small free end 10 gripping in the first convolution of the spring metal bellows. The release bearing 1 is thereby radially positioned and requires no further guidance.

In operation the annular cylinder space 6 is filled with a pressure medium. In the application of the clutch more pressure medium flows through the channel 7 into the cylinder space 6, whereby the spring metal bellows is expanded in the axial direction, the release bearing 1 affixed thereto is pushed to the left and presses against the lever 11 of a cup spring, whereby the clutch is disengaged. In the event of misalignment between the cup spring and the drive shaft 12 or the like arranged in the center of the spring metal bellows 3, the release bearing 1 can be radially displaced with respect to the spring metal bellows 3 and automatically adjust to the center of rotation of the cup spring of the clutch. The amount of possible radial displacement of the release bearing 1 can be established by the wave shape of the spring metal bellows 3. Upon rising pressure in the cylinder space 6, the annular projection 13 of the connection ring 4 is pressed radially against the free end 14 of the spring metal bellows 3 whereby the sealing action is automatically increased. The ring-shaped projection 13 of the connection ring 4 grips under the first inside corrugation of the spring metal bellows 3 with its free end 14 and thereby functions as an axial clamp. When engaging the clutch, the release bearing 1 is pushed axially toward the right by the spring action of the spring metal bellows 3 and the pressure medium is driven out from the cylinder space 6.

The arrangement illustrated in FIG. 2 is provided with two concentrically arranged essentially tube-shaped spring metal bellows 15, in contrast to the example illustrated in FIG. 1. A second connection ring 16 interconnects the release bearing 1 with the spring metal bellows 15. A seating surface 17 and a ring-shaped holding lip 18 are molded therein and thereon respectively. The sealing follows in a similar manner to that already described for the right connection ring 4 of FIG. 1. In addition, the functions are the same as in the first example.

The illustrated embodiments are only examples, In particular, the shape of the spring metal bellows 3, 15 can be adapted to each application. Also the affixing of the release bearing 1 respectively to the opposite side can be effected in different manners.

We claim:

1. In an hydraulic release arrangement for vehicle clutches or the like comprised of an annular cylinder arranged around a drive shaft or the like and acting axially on a release bearing said annular cylinder having first and second circumferential walls, the first circumferential wall of the annular cylinder comprising a first axially expandable spring metal bellows; the improvement wherein the second circumferential wall is comprised of a second spring metal bellows, and the release bearing is connected firmly to both the spring metal bellows and is axially guided by said first and second bellows and solely radially and circumferentially guided by said first and second bellows.

2. Hydraulic release arrangement according to claim 1, wherein the two spring metal bellows are formed as a single component with U-shaped cross-section (3).

3. Hydraulic release arrangement according to claims 1 or 2, wherein one side wall of the annular cylinder is comprised of a self-sealing elastic connection ring.

4. Hydraulic release arrangement according to claim 3, wherein a formed seating surface and holding arrangement for the release bearing are provided on said connection ring.

5. Hydraulic release arrangement according to claim 3 wherein channels for the pressure medium are arranged in said connection ring.

6. In an hydraulic release arrangement wherein an hydraulic cylinder is mounted to axially move the release bearing of a vehicle clutch, the release bearing being substantially coaxial with respect to a drive shaft and being axially moveable with respect thereto; the improvement wherein said hydraulic cylinder is annular and surrounds said shaft, the radially inner and outer walls of said hydraulic cylinder being comprised of spring metal bellows, and further comprising means firmly affixing said release bearing to one axial end of said hydraulic cylinder, said release bearing being held and guided in the radial direction solely by said hydraulic cylinder.

7. The hydraulic release arrangement of claim 6, wherein the spring metal bellows forming the inner and outer walls of said hydraulic cylinder are interconnected at said one axial end to define a single element.

8. The hydraulic release arrangement of claim 7, wherein said affixing means comprises means on said release bearing snapped onto a convolution of one of said spring metal bellows.

9. The hydraulic release arrangement of claim 6, wherein said radially inner and outer walls are separate spring metal bellows, and said affixing means comprises means on said release bearing sealingly snapped to at least one convolution of each of said spring metal bellows at said one axial end thereof.

10. The hydraulic release arrangement of claim 6, further comprising a sealing arrangement sealingly held between said spring metal bellows to define the other axial end of said hydraulic cylinder.

11. The hydraulic release arrangement of claim 10, wherein said sealing ring extends between said spring metal bellows at said other axial end of said cylinder and is snapped into convolutions thereof.

12. The hydraulic release arrangement of claim 10, further comprising a channel extending through said sealing ring for introducing a pressure fluid to and venting said hydraulic cylinder.

* * * * *

UNITED STATES PATENT AND TRADEMARK OFFICE
CERTIFICATE OF CORRECTION

PATENT NO. : 4,482,040
DATED : November 13, 1984
INVENTOR(S) : BRANDENSTEIN, ET AL It is certified that error appears in the above-identified patent and that said Letters Patent is hereby corrected as shown below:

Column 4, line 5, delete "(3)".

Signed and Sealed this

Seventeenth Day of December 1985

[SEAL]

Attest:

DONALD J. QUIGG

Attesting Officer

Commissioner of Patents and Trademarks